United States Patent [19]

Barber et al.

[11] Patent Number: 4,652,041
[45] Date of Patent: Mar. 24, 1987

[54] MOBILE LIVING QUARTERS

[76] Inventors: Gerald L. Barber, 10 Whittington Ct.; Wayne P. Comstock, 23 Sclwyn Dr., both of Greenville, S.C. 29615

[21] Appl. No.: 605,380

[22] Filed: Apr. 30, 1984

[51] Int. Cl.⁴ .............................................. B60P 3/32
[52] U.S. Cl. .................................. 296/171; 296/168; 296/173; 52/67
[58] Field of Search ............... 296/168, 171, 172, 173, 296/175, 176, 26, 156, 27; 52/67, 143; 105/314.5, 393

[56] References Cited

U.S. PATENT DOCUMENTS

| | | | |
|---|---|---|---|
| 2,225,319 | 12/1940 | Rollo | 296/171 |
| 2,692,161 | 10/1954 | Van Tassel | 296/173 |
| 2,813,747 | 11/1957 | Rice, Jr. | 52/67 X |
| 2,840,101 | 6/1958 | Saylor | 296/168 |
| 2,906,556 | 9/1959 | Cantele et al. | 296/26 |
| 2,965,412 | 12/1960 | Henderson et al. | 296/171 |
| 3,107,116 | 10/1963 | Meaker | 296/171 |
| 3,181,910 | 5/1965 | Thomas | 52/67 |
| 4,128,269 | 12/1978 | Stewart | 296/171 |
| 4,253,283 | 3/1981 | May | 52/67 |

FOREIGN PATENT DOCUMENTS

| | | | |
|---|---|---|---|
| 235156 | 12/1963 | Austria | 296/168 |
| 2109864 | 12/1971 | Fed. Rep. of Germany | 52/67 |
| 2641142 | 3/1978 | Fed. Rep. of Germany | 52/67 |
| 1346115 | 11/1963 | France | 296/168 |
| 2360444 | 4/1978 | France | 296/27 |
| 7400006 | 7/1975 | Netherlands | 296/171 |

Primary Examiner—Robert B. Reeves
Assistant Examiner—Russell D. Stormer
Attorney, Agent, or Firm—Dority & Manning

[57] ABSTRACT

A mobile vehicle quarters is illustrated which includes a trailer vehicle frame (A) consisting of a number of sectional frames (C). Each sectional frame includes two sides (39a, 39b) each of which includes a base frame (20, 22) and a slidable frame (38, 40). Each sectional frame carries a pair of opposing compartments (B). Two rows (100, 102) of compartments are thus formed on the two sides of the trailer frame. The compartment (B) includes a first section which is fixed to a vertical frame (30, 32) which divides the sectional frame into two sides. The first sections are hung from the vertical frame while a second section (72) slides relative to the thick section (60). The movable section (72) includes a floor section (86) which slides beneath a floor (70) of the fixed section to a nested travel configuration. When moved to an open position, the two sections (60 and 72) provide a living quarters. A central utility channel space is provided between the backs of the opposing compartments through which utility services are routed to the individual compartments. An air distribution duct (34) delivers conditioned air to the individual compartments by way of individual room registers (116). A fluid holding tank (120) is formed between the longitudinally extending I-beams (10 and 12) of the vehicle frame (A) for holding waste liquid coming from the compartments.

31 Claims, 9 Drawing Figures

MOBILE LIVING QUARTERS

BACKGROUND OF THE INVENTION

The invention relates to a mobile living quarters vehicle on which a plurality of self-contained individual living compartments are carried which may be transported in a closed position and opened to a living quarters position when the vehicle is stationary.

Heretofore, mobile homes on vehicle frames with wheels have been known which use expansible rooms as shown in U.S. Pat. Nos. 2,813,747, 2,692,161, and 2,965,412. The foregoing are typical of the expandable mobile home concept which includes expansion of an already existing room space. This concept is distinguished from mobile living spaces created by two relative movable sections in which there is no living space when closed yet provide a small self-contained quarters when opened.

U.S. Pat. No. 2,886,856 discloses an expandable trailer which has a number of individual rooms on each side of the trailer which have common side walls and may be folded out from a central space or hall. Here again, the concept is to expand an already existing space into a larger space partitioned off into individual compartments. No privacy or individually structured and identifiable units are provided by this concept.

The above mobile home and room structures are not directed to the provision of individual unattached living quarters in which individuals may live temporarily in the individual compartments with privacy and separation from one another.

It has been the concept and structure of the prior expandable type mobile homes to merely provide for expansion of an already existing space to increase the space normally in one or more pre-existing rooms of the mobile home. The above structures are mainly intended to be trailored to a desired site and set up. While they are mobile and can be taken back down and transported to another site, the workings of the frames for supporting the expandable rooms are time consuming in the operation and setup which does not lend these type structures readily to frequent mobile use. The frames on which they are transported are not suitable for frequent heavy highway use.

Accordingly, an important object of the present invention is to provide a mobile living quarters having a number of individual living units in which a single individual may temporarily live for such purposes as circus groups, rodeo groups, race car crews, and the like groups which travel frequently and usually stay only a week or two at one site.

Still another important object of the present invention is to provide a mobile vehicle having a plurality of individual self-contained living compartments which are separated and physically unattached from each other to provide privacy and a feeling of total identity for each living quarters.

Still another important object of the present invention is to provide a mobile living quarters which comprises a plurality of living compartments arranged side-by-side in rows with side spacing and spacing of each compartment and a central utility channel extending through the back spacing of the compartments for routing utility services to the compartments individually.

Still another important object of the present invention is to provide a mobile living quarters having a plurality of individual, self-contained living compartments each consisting of a pair of sections wherein one section is fixed and a second section is slidable on a vehicle frame to open and close the living quarters quickly and easily for repeated setups.

Still another important object of the present invention is to provide a mobile living quarters vehicle having a plurality of individual self-contained living compartments which are centrally serviced and air conditioned yet private and isolated from one another for individualized living.

Still another important object of the present invention is to provide a mobile living quarters having a frame which sectionalizes the living units so that the units are unattached, separately identifiable and independently utilizable.

SUMMARY OF THE INVENTION

The above objectives are accomplished according to the present invention by providing a mobile living quarters vehicle which includes an elongated vehicle frame and a plurality of individual self-contained living compartments carried side-by-side along the vehicle frame. A first row of the compartments is carried along a first side of the elongated vehicle frame and a second row of the compartments is carried along a second side of the vehicle frame about a longitudinal axis. Each living compartment includes a first stationary room section having a major wall fixed to the vehicle frame and a second movable room section slidably carried by the vehicle frame. The second section moves from a closed position in which the sections are nested together to an open position wherein the sections are moved away from each other to provide a living space. The compartments of the first and second rows are arranged behind each other in a back-to-back arrangement with opposing compartment pairs with the major walls of the fixed section opposing each other. The elongated vehicle frame includes a number of sectional cross frames which are exclusively associated with each respective pair of opposing compartments for carrying the compartments spaced from each other side-by-side. A vertical frame between the compartments of each opposing pair provide back-to-back spacing between the compartments and means for suspending the fixed section with the movable section sliding beneath the fixed section. The sectional cross frame includes individual movable horizontal frames for carrying the movable sections of each opposing pair of compartments. The compartments may be opened individually with the remaining compartments left closed.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now to the drawings, a mobile living quarters is illustrated in the form of a vehicle which includes an elongated vehicle frame A. A plurality of separated and individual self-contained living compartments B are carried side-by-side on the vehicle frame. A first row of living compartments is carried on one side of the vehicle frame and a second row of living compartments is carried on another side of the vehicle frame and the trailer is balanced. The compartments of the first and second rows are carried behind each other in opposing compartment pairs which are in a back-to-back arrangement with a front door of each compartment facing outwards. Each living compartment B includes a first section fixed to the vehicle frame and a second section which is carried on a sliding frame so that the second section slides between a closed nested travel position and an open living position in which a living quarter space is provided. A number of sectional frame means C are spaced along the length of the vehicle frame A for carrying the individual compartments with side and back spacing so they are physically unattached. Individual sliding frames are included in each sectional frame means for carrying the movable section so that the compartments may be opened and closed independently of each other. A liquid holding tank is carried between a pair of longitudinal main frame members for containing liquid waste coming from the compartments with balanced dynamic loads. Plumbing connections are carried in each individual compartment which are connected to the holding tank.

As illustrated in more detail, the vehicle frame A includes two longitudinally extending main frame members 10 and 12 in the form of I-beams which are laterally spaced and parallel with each other. Each I-beam includes vertical webs 10a and 12a, respectively. The I-beams form a vehicle trailer having a single axle with double wheels on each side. The front of the vehicle trailer frame includes a goose-neck 15 with a trailer connection 16 which may be connected to a suitable motor cab. A pair of spaced landings 18 are carried by the vehicle frame A for supporting the frame when parked and in use.

Figure 3:
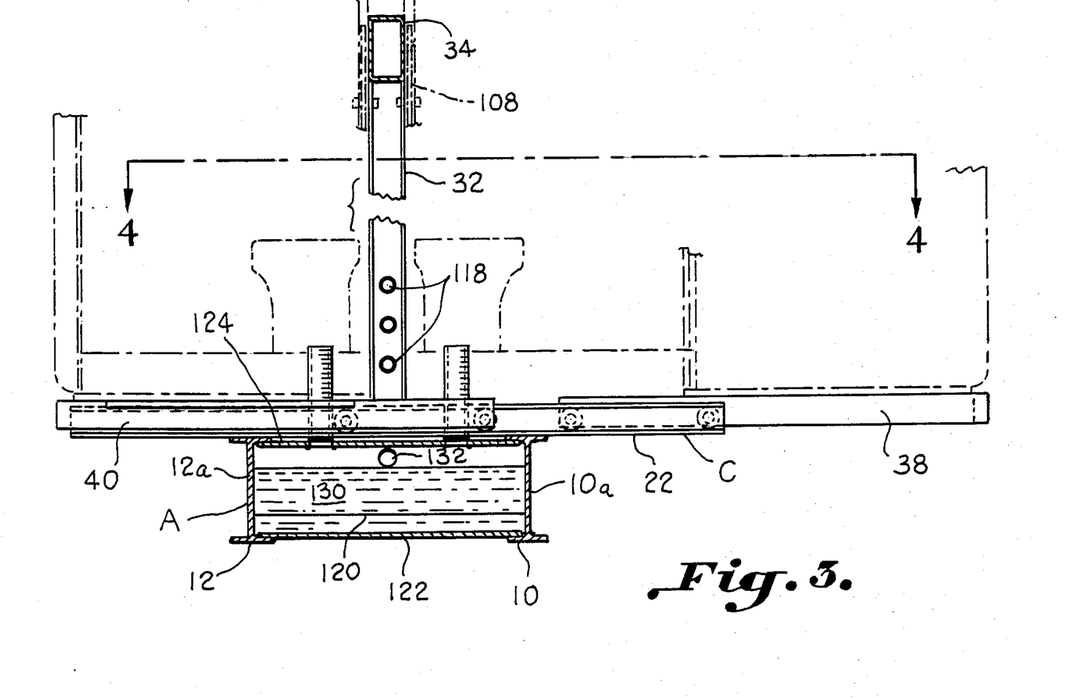
FIG. 3 is an elevation illustrating a vehicle frame for carrying a number of living compartments individually on a mobile living quarters vehicle so the compartments are spaced and physically unattached from each other and may be used independently of one another.
Figure 4:
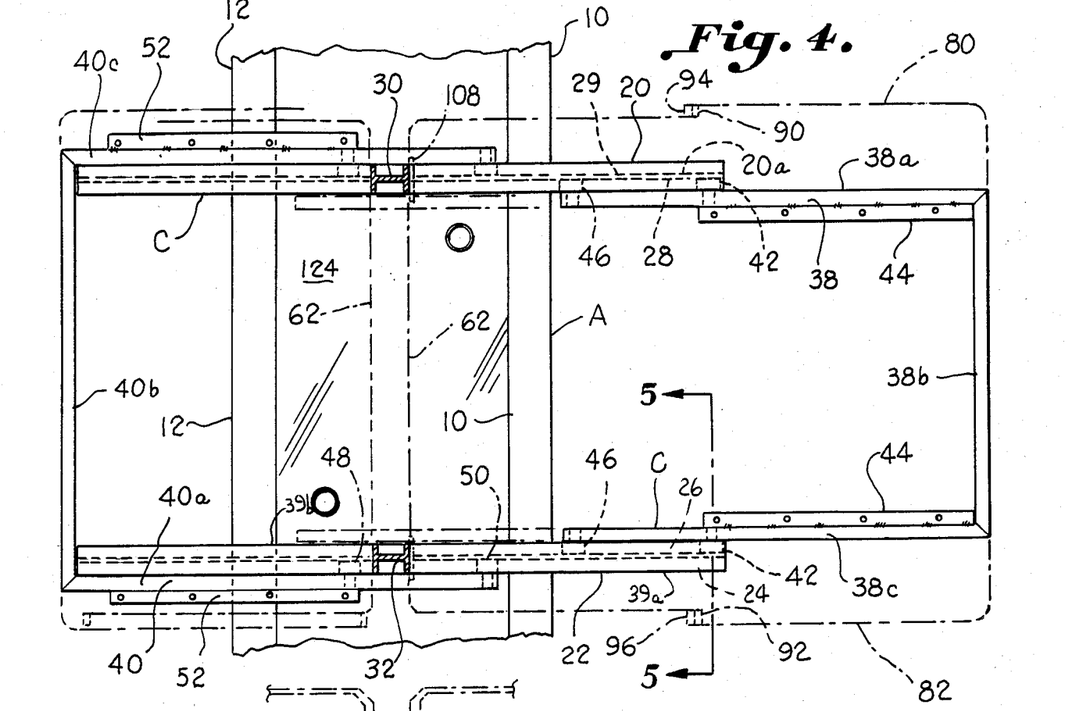
FIG. 4 is a sectional view taken along line 4—4 of FIG. 3.
Figure 5:
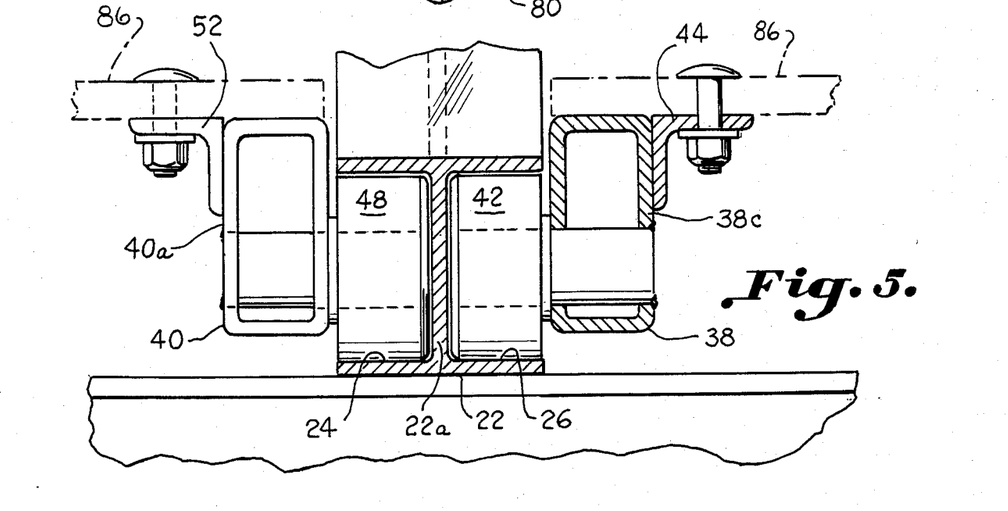
FIG. 5 is a sectional view taken along line 5—5 of FIG. 4.

Referring now in more detail to the sectional frame means C as can best be seen in FIGS. 3 and 4, each sectional frame means C includes a pair of cross frame members 20 and 22 which extend across and are affixed to the I-beams 10 and 12 having free cantilevered ends. The cross frame members 20 and 22 are in the form of I-beams such that a first slide track 24 is formed on one side of the web 22a of the I-beam 22 and a second slide track 26 is formed on the horizontal flange on the other side of the web 22a. Similar first and second slide tracks 28 and 29 are formed on the opposing sides of the web 20a of each of the I-beams 20.

Each sectional frame includes a pair of vertical H-beams 30 and 32 which provide a vertical frame means for supporting the fixed first section of each compartment and spacing the major back walls of the fixed sections. A longitudinal air distribution duct 34 extends along a longitudinal axis of the vehicle frame generally midway of the sides thereof. The duct ties the individual H-beams together along the length of the compartment rows and distributes air to the individual compartments from an air conditioning source.

The vertical H-beams divide the sectional frame C into two sides. On a first side 39a of each sectional frame there is an individual horizontal sliding frame 38 and a stationary base frame 39. On a second side 39b of the sectional frame is an individual horizontal sliding frame 40 and the sectional base frame provided by I-beams 20, 22. The sliding frame 38 includes a pair of wheels 42 which are received on the inside or second slide tracks 25, 26 of the I-beams 20 and 22. The horizontal frame 38 consists of three legs of box frame elements 38a, 38b, and 38c. There is a pair of connecting flanges 44 affixed to legs 38a and 38c for connecting the sliding frame to the second movable section of the compartment which is carried thereon. There is a second rear pair of wheels 46 carried by the legs 38a and 38c which also slide in the slide tracks 26 and 28 behind the wheels 42.

The sliding frame 40 on the second side 39b of the base of the sectional frame consists of three legs 40a, 40b, and 40c. Each leg is a box frame element. Legs 40a and 40c include a front pair of wheels 48 and a rear pair of wheels 50 which slide in the outside or first sliding tracks 24 and 29 of the cross frame I-beams. In this manner, the legs 40a and 40c may slide relative to the legs 38a and 38c of the two respective sliding frames so that the sliding sections of the compartments carried thereby may be closed simultaneously. Attachment flanges 52 connect the sliding frame to the second sections of the compartments on the second side of the frame.

Thus it can be seen, that a highly compact and convenient to use sectional frame is provided for carrying the compartments on the vehicle frame in back-to-back fashion. The individual front sliding sections may be conveniently slid to the living quarters position independently of one another for individual use. The spacing of the sectional frames along the longitudinal main frame elements 10 and 12 of the vehicle frame provide the required side and back spacing of the compartments so that they are unattached and separated to give individual identity to each unit. This not only provides privacy and sound-proofing but gives each individual roomer the feeling that he is occupying his own living quarter space not shared by any other person. Referring now in more detail to the individual living compartments, as can best be seen in FIGS. 2 and 6, each living compartment B includes a first fixed section designated generally as 60 which is the rear of the living quarters. Each section 60 includes a back major wall 62, a pair of integral minor side walls 64 and 66 integral with the back wall. There is a first roof means 68 integral with the back wall and side walls for defining a top enclosure of the first section. There is a first floor means 70 integral with the back walls and side walls for defining a bottom enclosure of the first section.

Figure 6:
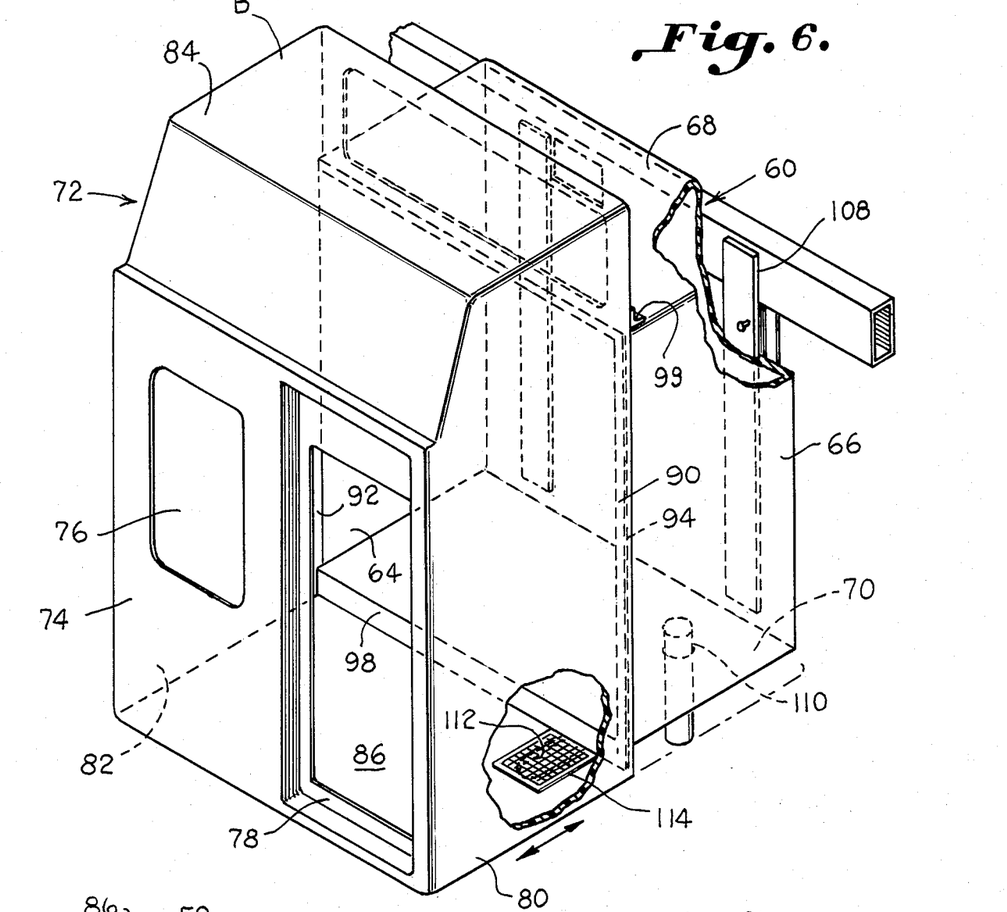
FIG. 6 is a perspective view illustrating a living compartment constructed according to the present invention for use on a mobile living quarters vehicle.

The compartment B includes a second movable section, designated generally as 72, which forms the front section of the living quarters. The front section slides relative to the first section and has a front major wall 74 in which a window 76 and an entry door 78 are formed. There is a pair of minor side walls 80 and 82 integral with the front wall. A second roof means 84 provides a top enclosure for the second section. There is a second floor means 86 which is integral with the front wall and side walls for defining a bottom enclosure for the second section.

Figure 2:
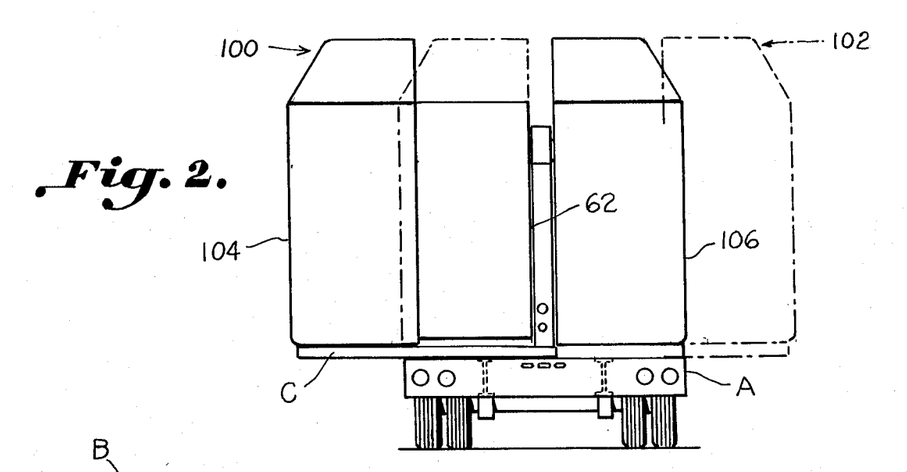
FIG. 2 is an end view illustrating a mobile living quarters vehicle constructed according to the present invention.

Referring to FIG. 2, the second section 72 slides to a closed position as shown in the right hand compartment B in which the second section and first section are nested together in a compacted configuration for travel. In the nested configuration, there is no amount of space sufficient for habitation within the sections. The second section slides to an open position as shown by the left hand compartment B of FIG. 2 and FIG. 6. In the open position, the first and second sections are generally open to each other between their front and back walls to provide a living quarters.

As can be seen, the first and second sections are open opposite their major walls and a junction is defined where the sections meet each other when the sections are in the living quarters configuration. The junction is defined by flanges 90 and 92 which are outwardly turned and formed on the sides of the first section. The flanges overlap and abut a slight very small thin strip 94 and 96 on the back sides of the second section. A plate 98 is affixed over the facing edge of the floor 70 of the first section and depends downwardly adjacent the floor 86 of the second section to finish off the junction. Atop the first section is a rainstop flange 99 which seals off and makes the junction at the back. The flanges so described define a closure means for sealing off the junction of the first and second sections.

When the sections are open, a bunk bed (not shown) folds down from the first section and lies across the sections with the foot of the bed below the front window (FIG. 6). A shower/toilet unit occupies the corner opposite the front door. Storage shelving is also provided in each room unit. Suitable locking pins (not shown) lock opposing compartments together in their nested configuration for travel.

Having described the individual compartments B, reference will now be made to the arrangement of the compartments in a first row 100 on one side of the vehicle frame and a second row 102 on a second side of the vehicle frame. The compartments are side-by-side. The compartments of the first and second rows form opposing pairs of compartments such as at 104 and 106 wherein they are arranged in a back-to-back configuration. The back major walls 62 of opposing compartments B are spaced by the vertical frame means provided by the H-beams 30 and 32. The back walls 62 of the first sections are attached to the H-beams by means of bolts.

There is a reinforcing means provided in the back walls of the first section in the form of a steel plate 108 which is molded into the sections through which the bolts penetrate and hold the back walls steadfastly to the H-beams. In this manner, the first sections 60 are suspended from the vertical frame means while the second section 72 is carried on the sliding frame 38 or 40 of each sectional frame C. The floor section 86 of the front section 72 slides beneath the floor section 70 of the back section 60 suspended from the vertical frame. Since the back section 60 is suspended from the vertical frame, there is nothing underneath the floor of the back section to obstruct the sliding of the second section.

There is a plumbing connection means 110 in each compartment. The floor 86 of the front of the second section 72 includes an oval slot 112 so that the floor section will slide relative to the plumbing connector 110 which is in the form of a pipe. When the second section 72 is moved to the living quarters position, the slot 112 is covered with a standard variably opened floor register 114.

Each compartment is provided with a variably operable air register 116 which communicates with an opening 34a formed in the air distribution duct 34 in that compartment. The air register 116 may be opened and closed to allow air into the room which is either cooled or heated to satisfy the comfort of the roomer. The bottom register 114 may be opened to allow heated air to flow naturally from the register 116 to the register 114.

The spacing between the back walls 62 of opposing compartments along the rows of compartments provides for a utility channel space for routing of utility services to the individual compartments. For this purpose, cut-outs 118 may be formed in the H-beams 30 and 32 along the length of the vertical frame for the routing of water pipes, electrical wiring, and the like. These of course, may be shielded by suitable conduiting for protecting of the pipes or wiring. This utility space also provides for separation between the compartments for privacy and individual identity.

Figure 1:
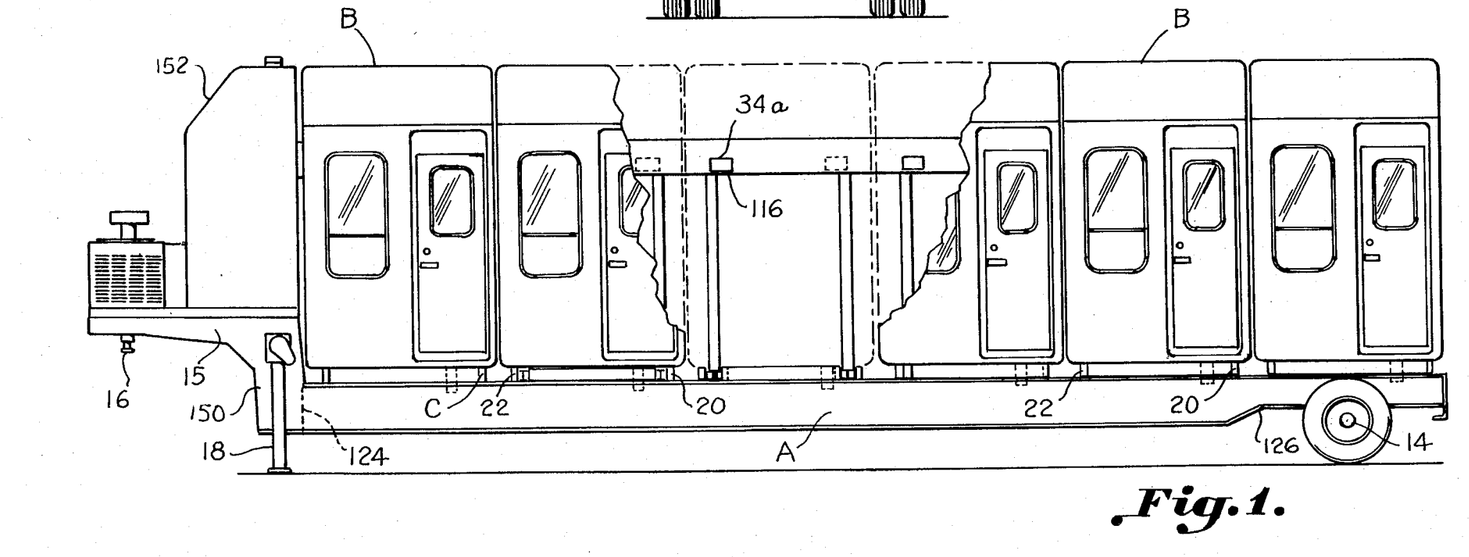
FIG. 1 is a side elevation illustrating a mobile living quarters constructed according to the present invention.
Figure 8:
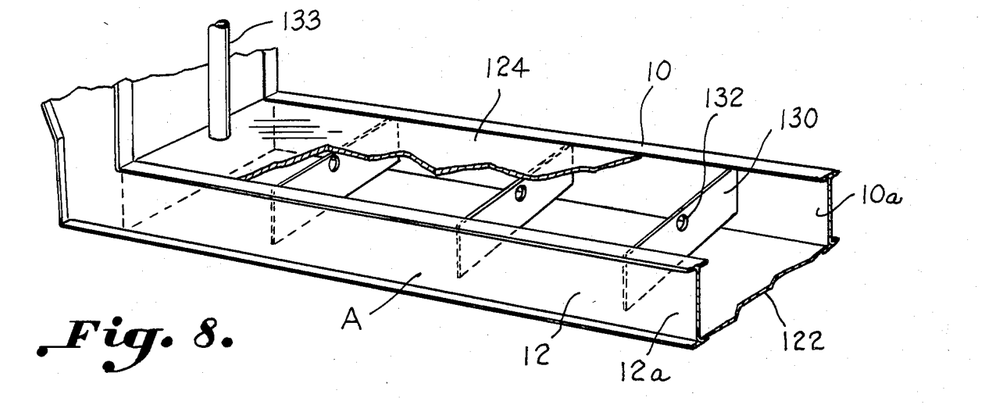
FIG. 8 is a perspective view with parts cut away illustrating a liquid holding tank for use with a mobile living quarters vehicle according to the present invention with baffles for reducing the dynamic affects of the waste liquid moving back and forth in the trailer.
Figure 9:
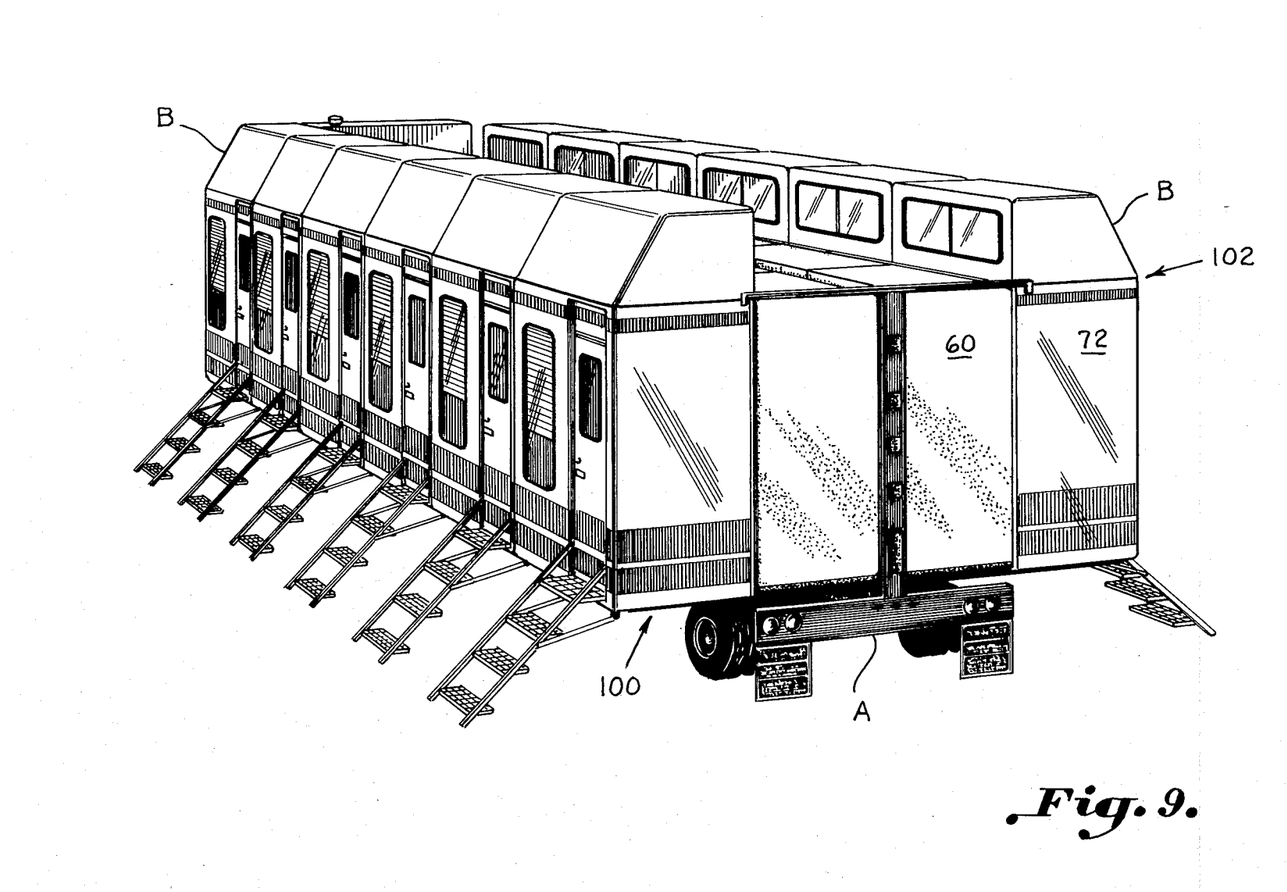
FIG. 9 is a perspective view illustrating a mobile living quarters constructed according to the invention.

Referring now to FIGS. 3 and 8, it can be seen that a liquid holding tank is carried by the vehicle frame for receiving liquid waste from the individual compartments. The liquid holding tank means 120 is formed with the vertical webs 10a and 12a as the sides of the holding tank. A bottom plate 122 bridges the flanges of the I-beams 10 and 12 to close the bottom of the tank, and a top plate 124 is welded between the top flanges of the I-beams to provide a top plate and complete enclosure for the liquid holding tank. The liquid holding tank extends essentially from the point 126 (FIG. 1) of the vehicle frame to the forwardmost junction 124 of the vehicle frame with the gooseneck section. The plumbing connections 110 in the compartments are connected to the fluid holding tank by openings in the top plate 124 for delivering liquid waste into the tank.

Included in the liquid holding tank is a number of baffle plates 130. These plates extend across from one web to the other of the I-beams 10 and 12, however, the plates terminate short of the bottom plate 122 to leave a space for the limited shifting of water back and forth in the tank. A gas vent 132 is carried in the upper portion of the plate to allow gas to pass along the top of the fluid holding tank and be vented out through a vent pipe 133 from the top. The baffle plates are spaced along the length of the liquid holding tank as needed.

Figure 7:
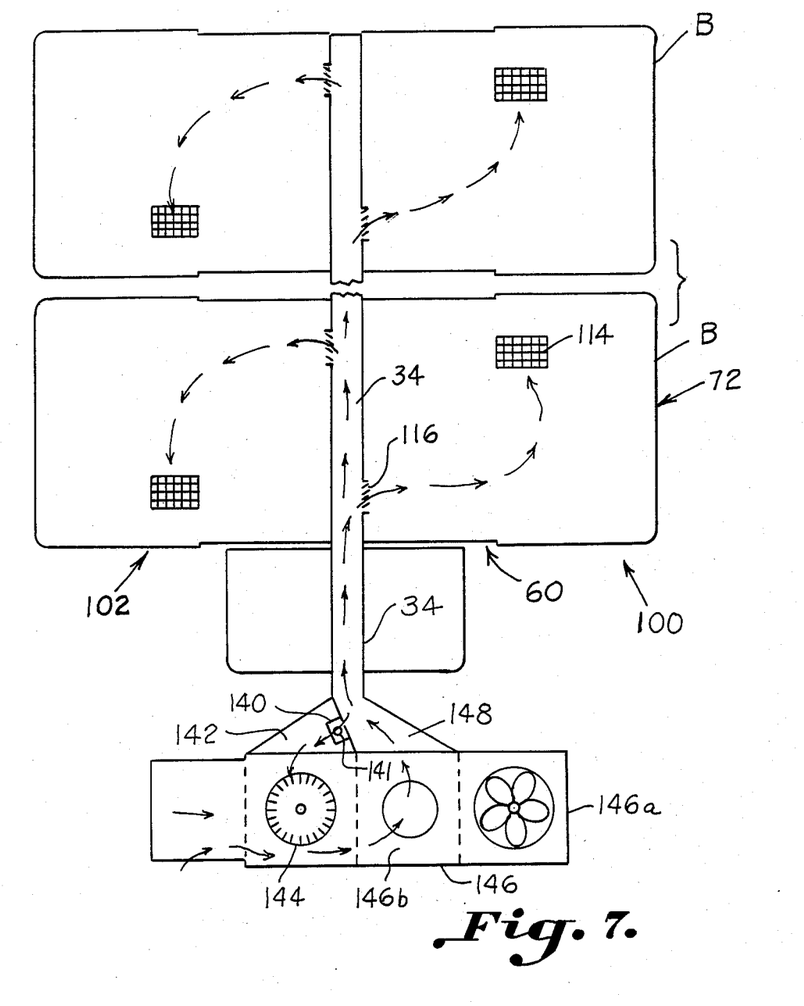
FIG. 7 is a schematic illustration of an air distribution system according to the present invention for distributing conditioned air to the individual living compartments according to the present invention.

Referring now to FIG. 7, an air distribution system is illustrated. Due to the fact that the air conditioning system is basically a non-return system, means must be provided for equalizing the flow of air through the individual registers in the compartments when a number of the registers are closed. Since the air is being delivered to individual room compartments, it is desired that the air not be returned so that individual odors will not be circulated throughout the remaining compartments.

For this purpose, a weighted damper door 140 is provided which opens into the air intake duct 142 flowing into the blower 144 of a conventional air conditioning system 146. On the other side of the damper door is an air outlet duct 148 which leads to the central air duct 34. If the static pressure should build up in the air duct 34 due to the closure of a sufficient number of registers, the weighted door will open allowing air to be short-circuited back to the intake 142 of the blower 144 and thus eliminate excessive flow of air through the registers as might otherwise occur.

The heating and cooling in each compartment is controlled by controlling the opening of the register in the back wall to the individual's preference.

The damper door 140 is located in the partition between the intake duct and outlet duct. The damper door is hinged at the top and is adjustable by adjusting the amount of weight 141 which must be overcome by the air pressure for the door to open. This provides an automatic by-pass port means responsive to air pressure in the duct 34 to short circuit the air flow. Other means besides the weighted door structure may also be utilized to automatically by-pass air in response to static pressure in the duct. This prevents too much air from blowing into some units when the others have closed their registers. It also prevents overloading the blower when all the registers are closed.

In addition, there may be provided a timer delay on each heating and air conditioning unit to prevent it from coming back on within five minutes. This will prevent rapid cycling of the system during relatively mild weather. It may also be desirable to sense the air temperature both in the duct and internally in the heating air conditioning unit itself. Limit switches may be utilized in the heating, air conditioning unit to operate based on the temperature of the air flowing through the unit rather than having a room thermostat. These limit switches will cut the unit off at the given temperature if the air flowing through the unit is excessively hot or cold. An on and off switch for the fan may also be provided so that the fan may be used by itself.

Water may be supplied by hookup to an external water supply or self-contained water in a fresh water holding tank 150 formed in the goose neck. A conventional hot water tank (not shown) is located in a housing 152. Hot and cold water are plumbed into the compartments through the central utility channel and frame passages 118. Housing 152 also contains batteries, generators, and water pumps necessary for self-contained operation. Wiring through the utility channel delivers electrical power to the individual compartments. Air conditioning unit 146 may be any suitable central air conditioning, cooling and heating unit having a compressor unit 146a, and a heat exchange coil unit 146b.

Thus, it can be seen that an advantageous construction can be had for a mobile living quarters in accordance with the present invention. Each living compartment is individualized and has its own separate space and identity so that the person living therein in spatially and psychologically separated from the remaining living compartments and roomers. The frame for supporting the individual compartments quickly and easily moves the compartment sections from a closed to a living quarters position. The compartments may be opened or closed as quickly and oftenly as desired to move from one location to another. The vehicle has a well balanced configuration for highway use and utility services are centrally delivered to the compartments to provide a completely self-contained physically unattached living space for each roomer.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. A mobile living quarters vehicle comprising:
an elongated vehicle frame;
a plurality of individually enclosed living compartments carried on said vehicle frame;
a first row of said compartments carried along a first side of said elongated vehicle frame;
a second row of said compartments carried along a second side of said elongated vehicle frame;
each said living comparment comprising a first stationary room section having a major wall affixed to said vehicle frame and a second movable room section slidably carried by said vehicle frame;
said second movable section being movable between a closed position in which said second section is nested with said first section and an open position in which said first and second sections are extended relative to each other; wherein
said major walls of said compartments of said first and second rows are arranged opposite one another in spaced-apart relationship.

2. A vehicle as in claim 1, wherein:
said vehicle frame includes a plurality of sectional cross frame means spaced along said elongated vehicle frame, one each of said sectional frame means being exclusively associated with a respective pair of opposing compartments for carrying said compartments spaced from and physically unattached from adjacent pairs of opposing compartments on said vehicle frame; and
vertical frame means included in each said sectional cross frame means for carrying said first sections of each opposing pair spaced apart in said back-to-back arrangement physically unattached;
each said sectional cross frame means including a horizontal movable individual frame means for slidably carrying the second sections of each compartment of said opposing compartment pair on said vehicle frame individually from one another and from adjacent compartments permitting each said second section to be moved to said open position and said compartments to be utilized independently of each other.

3. The apparatus of claim 2 including:
a utility channel space defined between said first and second rows of living compartments for routing utility services individually to said compartments;
said vertical frame means carrying an air distribution duct longitudinally along the length of said compartment rows which distributes conditioned air to said living compartments; and air entrance ducts carried by each said living compartment connected to said air distribution duct through which air is delivered in two said compartments.

4. The vehicle of claim 3 including:
a source of conditioned air carried on said vehicle;
an air intake duct carried by said source for delivering air to said source;
an air outlet duct connected to said source and to said air distribution duct for delivering conditioned air through said air distribution duct into said individual compartments;
by-pass port means connecting said outlet duct and intake duct responsive to air pressure in said air distribution duct to short circuit the flow of air from said outlet duct directly into said intake duct.

5. The vehicle of claim 2 including:
a fluid holding tank means carried by said vehicle frame extending underneath said individual compartments for holding waste liquid; and
plumbing connection means carried in each compartment connected in fluid communication with said holding tank means.

6. The vehicle of claim 5 including:
a pair of parallel main frame members extending longitudinally in said vehicle frame, said cross frame means being transverse to said main frame members; and
said holding tank means carried between said main frame members extending generally beneath said compartments.

7. The apparatus of claim 6 wherein said main frame members form sides of said holding tank means, a bottom of said holding tank means is formed by a plate extending between lower portions of said side frame members and a top of said holding tank includes a plate extending between the tops of said main frame members through which interconnection with said plumbing connection means are made.

8. The vehicle of claim 5 wherein said sectional cross-frame means includes a pair of cross-frame members extending transverse to said elongated vehicle frame across both said first and second sides.

9. The vehicle of claim 8 wherein said slidable individual frame means includes a first sliding horizontal frame carried by said cross-frame members on said first side of said vehicle frame carrying one of said second sections of said opposing pair of living compartments, and a second slidable horizontal frame carried on said second side of said vehicle frame for carrying a second section of the second of said pair of opposing compartments.

10. The apparatus of claim 9 wherein said cross-frame members each include an inside and outside slide track; said first slidable frame means being carried on the inside slide tracks of said pair of cross-frame members while the second slidable horizontal frame means is carried on the outside slide tracks of said cross elements so that said slidable frame members slide on the same cross elements relatively past each other.

11. A mobile living quarters vehicle comprising:
(a) an elongated vehicle frame including a pair of longitudinally extending main frame members which are laterally spaced from one another;
(b) a plurality of separated individual living compartments carried side-by-side but unattached with respect to one another along the length of said vehicle frame;

(c) each said living compartment including:
(i) a first stationary section having a back major wall, a pair of minor side walls integral with said back wall, a first roof means integral with said back wall and side walls for defining a top enclosure for said first section, and first floor means integral with said back wall and side walls defining a bottom closure of said first section,
(ii) a second movable section which slides relative to said first section having a front major wall, a pair of minor side walls integral with said front wall, a second roof means integral with said front major wall and side walls defining a top closure of said second section, and a second floor means integral with said front and side walls for defining a bottom enclosure for said second section,
(iii) said second section being slidable to a closed position in which said second section and first section are nested together in a compacted configuration for travel of said vehicle, said second section being slidable to an open position in which said first and second sections are generally open to each other between said front and back major walls to provide a living quarters space within said first and second sections while said vehicle is not traveling,
(iv) a junction defined where said sections meet when said second section is moved to said second position, and
(v) closure means for sealing and closing said junction of said first and second sections,
(d) a plurality of individual sectional frame means included in said elongated vehicle frame for individually carrying said living compartments with spacing between said sides of said compartments so that adjacent compartments are unattached and separated from one another providing privacy and individual identity of said compartments on said vehicle frame; and
(e) each said sectional frame means including sliding frame means for carrying the second section of said compartments so that a second section of one compartment will slide to an open position while the remaining compartments are closed whereby said compartments can be utilized independently from one another as living quarters with remaining ones of said compartments closed; wherein
said compartments are arranged in two rows on said frame in back-to-back spaced-apart relationship.

12. The vehicle of claim 11 including:
each said individual sectional frame means including a vertical frame means for supporting said first section of said compartment and a base frame for carrying said sliding frame means; and
attachment means affixing said major back wall of said first section to said vertical frame means.

13. The vehicle of claim 12 wherein said first section of said compartment is unattached to said base frame means so that said second floor means of said compartment slides underneath said first floor means in said closed position while said first floor is carried in a suspended configuration by said first section.

14. The vehicle of claim 13 wherein said attachment means includes a vertical reinforcing means carried by said back wall of said first section, and fastening means extending through said vertical frame means and reinforcing means fastening said vertical frame and back wall together whereby said first section is hung from said vertical frame means.

15. The vehicle of claim 11, wherein:
said compartments of said two rows are in back-to-back arrangement of opposing pairs; and
each such opposing pair includes a compartment from one row and an opposed compartment from another row having their major back walls of their respective first sections facing one another in a spaced relationship.

16. The vehicle of claim 15 including:
a middle utility channel space defined between said spaced back walls of said compartments of said two rows generally along the length of said rows through which utility service may be routed to said individual compartments;
an air distribution duct carried longitudinally extending in said utility channel space; and
an air inlet carried by each compartment registering with said air duct through which conditioned air is delivered into each compartment.

17. The vehicle of claim 11 wherein said second roof means of said second section is elevated above said first roof means of said first section to provide increased vertical space and ventilation in said living quarters.

18. The vehicle of claim 11 wherein said side walls of said second section includes
vertical extensions integral therewith for elevating said second roof means above said first roof means and
a transparent panel carried in said vertical side wall extensions for providing a pathway for light into said living quarters.

19. A mobile living quarters vehicle comprising:
an elongated vehicle frame;
a plurality of individual self-contained living compartments;
each said compartment including a first stationary section affixed to said vehicle frame and a second movable section slidably carried by said vehicle frame;
said second slidable section having a closed position in which said first and second sections are nested together for travel with no living space within said nested sections and an open position in which said sections are moved apart to provide a living quarters space;
said second section having a front side including a compartment door providing access to said living quarters space;
a plurality of sectional cross frame means included in said vehicle frame spaced along the length of said vehicle frame for carrying said individual compartments at spaced locations along said vehicle frame;
said sectional frame means including individual slidable horizontal frame means for carrying said second section of said compartment;
said sectional frame means including vertical frame means for carrying said first section of said compartment in a suspended configuration;
said first section including a freely hanging first floor section, and said second section including a second floor section attached to said slidable horizontal frame means; and
said first floor section of said first section being spaced above said second floor section of said second section on said sectional frame means so that said second section of said floor slides underneath said suspended first floor section; and wherein
said plurality of compartments are carried by said sectional frame means in back-to-back spaced-apart relationship.

20. The vehicle of claim 19 including:
a first compartment carried at a first side of each said sectional frame means and a second compartment carried at a second side of each said sectional frame means, said first and second compartments being carried in said back-to-back configuration with said front compartment doors facing outwards and a back wall of said first sections of said compartments facing one another;
each said sectional frame means including first and second horizontal sliding frame means slidably carried on said first and second sides on which the second sections of said first and second compartments are carried; and
said vertical frame means spacing and supporting said first and second compartments in said back-to-back relationship.

21. The vehicle of claim 20 including a central utility channel defined between said back walls of said first sections of said opposing compartments for routing utility services to said individual compartments.

22. The vehicle of claim 19 wherein said sectional cross frame means includes a pair of spaced cross frame members extending across said elongated vehicle frame having first and second free cantilevered ends on which said first and second horizontal sliding frame means are carried, respectively.

23. The apparatus of claim 20 wherein said first and second cross frame members each have a first slide track on one side of the frame member and a second slide track on the opposite side of the said frame member; and
said first horizontal slide frame means being carried on the inside slide track means of said first and second cross frame members while said second horizontal slide frame means is carried on the outside slide track of said first and second cross frame members so that said first and second frame means can slide relatively past each other when said second sections of said first and second compartments are moved to said closed position.

24. The vehicle of claim 19 wherein said elongated vehicle frame includes:
a pair of longitudinal main frame elements which are laterally spaced in said vehicle frame, said main frame elements having vertical sides;
a bottom plate bridging the vertical sides of said main frame elements at a lower portion thereof;
a top plate bridging the vertical sides of said main frame elements at an upper portion thereof; and
a liquid holding tank defined between said vertical sides, bottom plate, and top plate for containing waste liquid from said compartments.

25. The vehicle of claim 24 including transverse baffle plates carried across holding tank between said vertical sides of said main frame elements spaced above said bottom plate to permit some shifting of liquid; and
vent means formed in an upper portion of said baffle plates permitting escape of gas through the top of said holding tank.

26. The vehicle of claim 25 including plumbing connection means carried in each compartment connected to said holding tank.

27. A mobile assembly, comprising:
a vertical support frame; and
a plurality of individual, unattached enclosures, mounted on said support frame; wherein
said plurality of said enclosures are arranged in two back-to-back rows in spaced relationship, thereby defining a central utility channel which branches to each of said enclosures; and wherein
each of said enclosures respectively has a fixed section including a first fixed floor means and a movable section including a second movable floor means nested therewith, with said fixed sections suspended from said vertical support frame to permit said second movable floor means to be received under said first fixed floor means; and
said assembly further comprises a plurality of slidable support means, one each of which is respectively associated with each of said movable sections, for permitting individual respective movement of each of said movable sections relative its respective fixed section between fully nested and fully un-nested configurations, wherein in said un-nested configuration each of said individual enclosures comprise separate, unattached living quarters, and in said nested configuration there is no space sufficient for habitation within the respective nested enclosure.

28. A mobile assembly as in claim 27, wherein said slidable support means are paired such that a given pair of slidable support means are nested with respect to each other whenever their respective associated movable sections are both in said nested configuration.

29. An assembly as in claim 27, further comprising:
longitudinal tank means, mounted beneath said enclosures between lengthwise elements of said support frame, for holding liquids therein;
plumbing means for respectively connecting each of said enclosures with said tank means; and
baffle means, included within said tank means, for reducing the dynamic affects of movement of liquids contained within said tank means during movement of and mobile assembly.

30. An assembly as in claim 27, further comprising air handler means, associated with said central utility channel for providing a flow of air to each respective enclosure, and further including biased damper means for ensuring a relatively even air flow to said each respective enclosure.

31. A mobile assembly, comprising:
a support frame; and
a plurality of individual enclosures, mounted on said support frame; wherein
said plurality of said enclosures are arranged in two back-to-back rows in spaced relationship, thereby defining a central utility channel which branches to each of said enclosures; and
said mobile assembly further comprises air handler means, associated with said central utility channel for providing a flow of air to each respective enclosure; and
further including biased damper means for ensuring a relatively even air flow to said each respective enclosure; wherein
said air handler means comprises:
a longitudinal air distribution duct carried generally along the length of said central utility channel,
an air inlet in each of said enclosures connected to said air distribution duct,
a source of conditioned air mounted on said assembly,
an air intake duct for delivering air to said source, and
an air outlet duct connected to said source and to said air distribution duct for delivering conditioned air through said air distribution duct into said individual enclosures; and wherein
said biased damper means includes by-pass port means connecting said outlet duct and intake duct responsive to air pressure in said air distribution duct to thereby short circuit the flow of air from said outlet duct directly into said intake duct.

* * * * *